Oct. 10, 1944.  W. A. HELSTEN  2,359,760
DUPLEX BRAKE
Filed Sept. 28, 1942   3 Sheets-Sheet 1
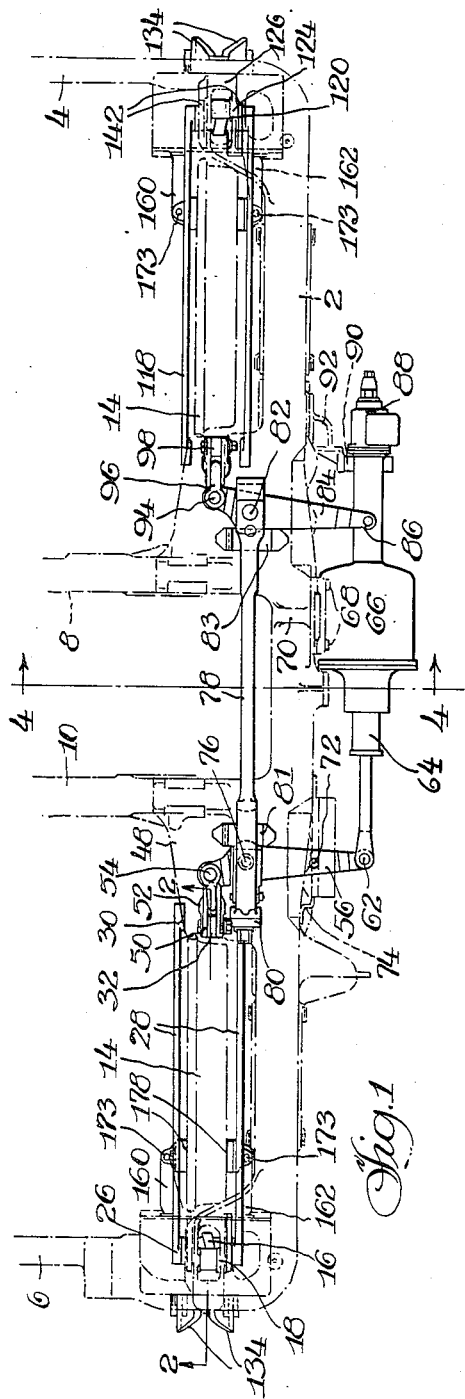
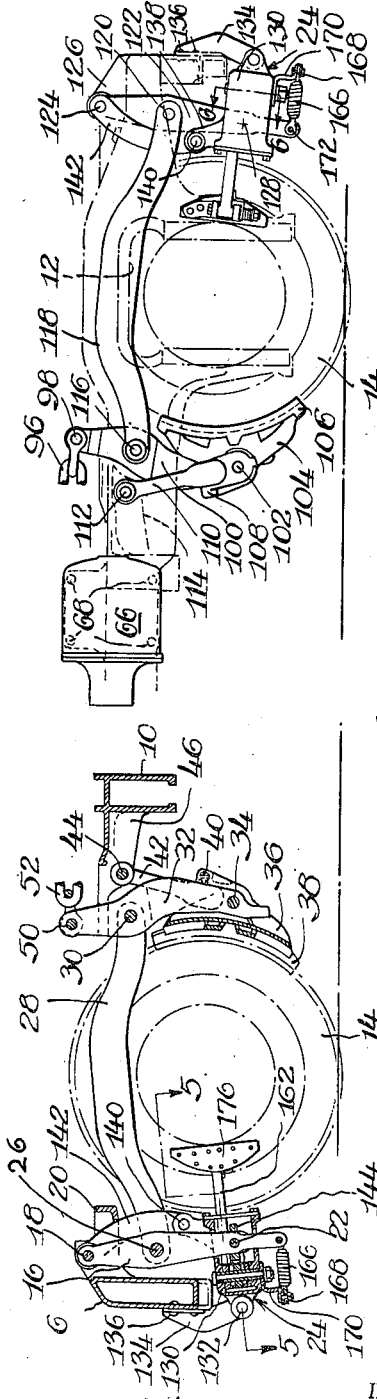
INVENTOR.
Wesley A. Helsten,
BY
Atty.

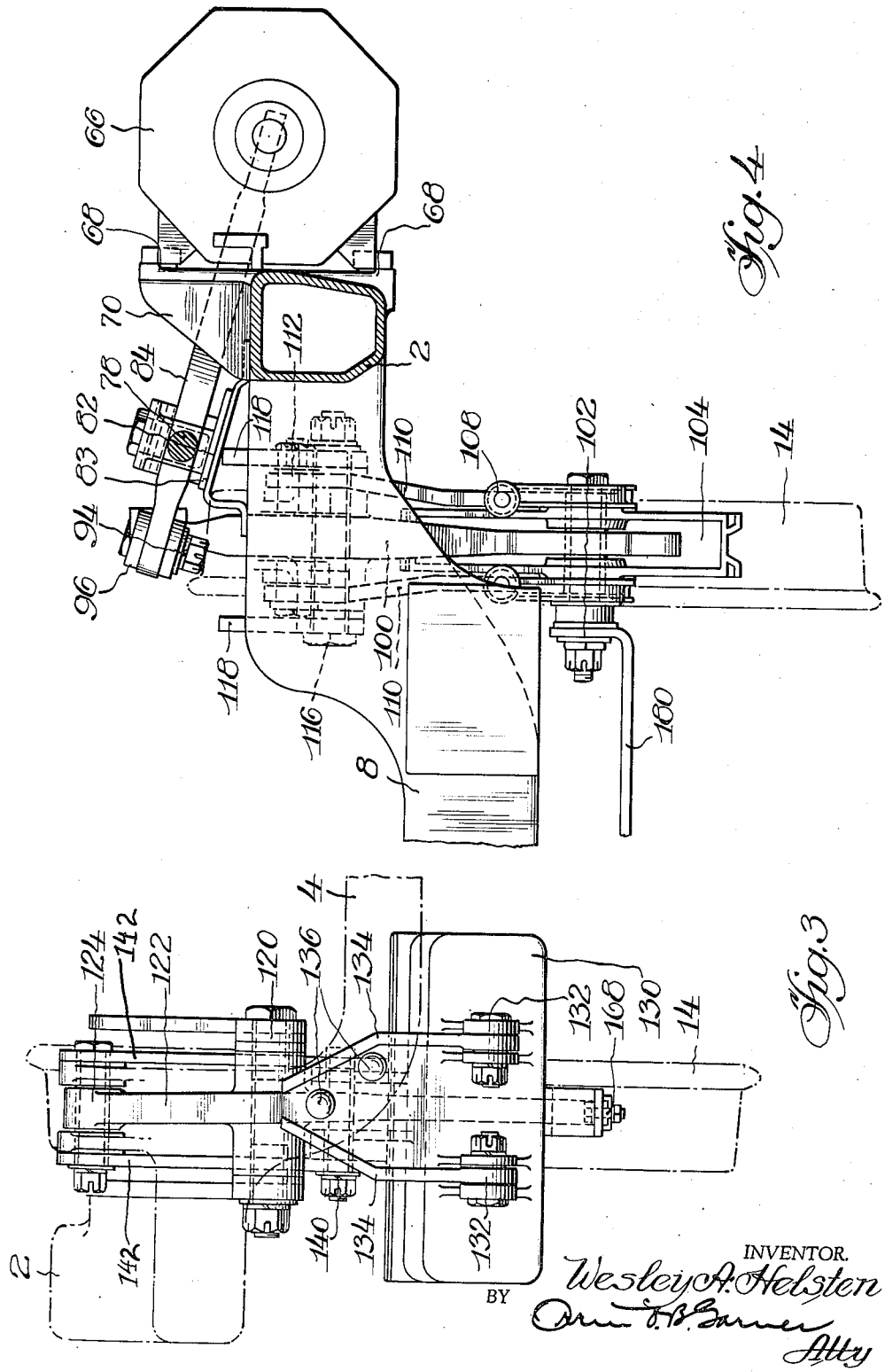

Oct. 10, 1944.  W. A. HELSTEN  2,359,760
DUPLEX BRAKE
Filed Sept. 28, 1942  3 Sheets-Sheet 3

INVENTOR.
Wesley A. Helsten
BY
Atty.

Patented Oct. 10, 1944

2,359,760

UNITED STATES PATENT OFFICE 2,359,760

DUPLEX BRAKE

Wesley A. Helsten, Chicago, Ill., assignor to American Steel Foundries, Chicago, Ill., a corporation of New Jersey Application September 28, 1942, Serial No. 459,900

18 Claims. (Cl. 188—33)

My invention relates to a brake arrangement for a railway car truck and more particularly to a brake arrangement commonly known as a "duplex" or a "Duo-Simplex" system comprising metal brake shoes on the treads of the wheels and composition brake shoes for engaging opposite faces of each wheel or an associated disc.

The general object of my invention is to devise such a form of brake arrangement wherein each wheel may be braked by metal brake shoes engaging the periphery of the wheel and by a plurality of composition brake shoes engaging inboard and outboard faces thereof.

A more specific object of my invention is to devise a "Duplex" brake arrangement wherein the power means for operation thereof may be mounted on the opposite side frames of the truck, thereby conforming to so-called unit cylinder arrangements.

A different object of my invention is to so combine the features of the "Duo-Simplex" brake arrangement in a four wheel railway car as to permit the metal brake shoes to operate intermediate the wheels and the means associated with the composition brake shoes to operate at the ends of the truck, thus affording maximum accessibility.

My novel arrangement also comprehends such a brake system as that referred to wherein vertical dead levers at the ends of the truck may actuate the operating means associated with the composition brake shoes for engaging inboard and outboard faces of each wheel, said operating means comprising in each case an equalizer lever operatively associated with bell crank means and wherein the bell crank levers associated with respective inboard and outboard portions of said operating means may be supported at a single pivotal point.

My brake arrangement also comprehends a novel release means for the brake rigging and certain novel details including a special form of equalizing lever more particularly set forth hereinafter.

In the drawings,

Figure 1 is a half top plan view of a railway car truck embodying my invention, only one-half of the truck structure being shown because the arrangements at opposite sides of the truck are similar.

Figure 2 is a side elevation, half in section, the section being taken approximately in the longitudinal vertical plane indicated by the line 2—2 of Figure 1 and certain parts being shown in elevation for clarification.

Figure 3 is an end view of the truck and brake arrangement shown in Figures 1 and 2, the view being taken from the right as seen in said figures.

Figure 4 is a transverse sectional view taken approximately in the vertical plane bisecting the truck as indicated by the line 4—4 of Figure 1.

Figure 7:
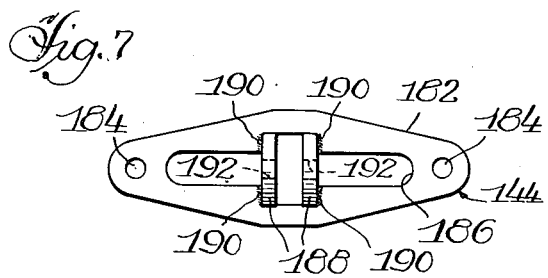
Figures 8, 9:
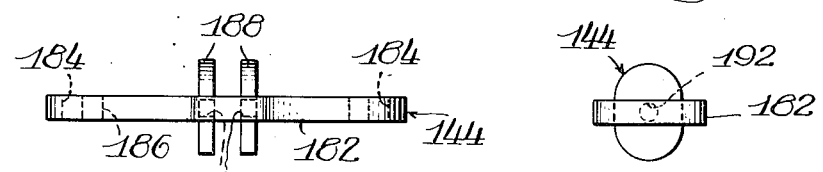

Figures 7, 8, and 9 show in detail my novel form of equalizing lever, Figure 7 being a plan view thereof, Figure 8 a side view, and Figure 9 an end view thereof.

For the sake of clarity, in each of the figures certain details may be omitted or shown in fragment where such parts are more clearly illustrated in other views.

In detail, my novel brake arrangement comprises a truck frame structure having the side member 2, end rails 4 and 6, and spaced transoms 8 and 10 affording support for the usual bolster which may be mounted therebetween. Each side member 2 is afforded at each end thereof the usual pedestal opening 12 for a journal connection with the associated wheel and axle assemblies 14, 14 and equalizing means (not shown) may be associated with each side frame member.

The braking means may comprise the dead lever 16 fulcrumed as at 18 from the bracket 20 formed as an integral part of the end rail 6 adjacent its juncture with the side member 2. Adjacent its lower end the dead lever 16 has a pivotal connection as at 22 to clasp brake operating means generally designated 24, to be described in detail hereinafter. At an intermediate point of the dead lever 16 may be pivotally connected as at 26 the paired inboard and outboard straps 28, 28 and the opposite ends of said straps may have pivotal connection as at 30 to an intermediate point of the live truck lever 32. The lower end of the live truck lever 32 may have pivotal connection as at 34 to the brake head 36 supporting the brake shoe 38, said head having the well known form of balancing means 40 associated therewith. At the pivotal point 34 may also be connected the hanger 42, said hanger being pivotally hung at its upper end as at 44 from the bracket 46 integrally formed with the gusset 48 reinforcing the juncture of the transom 10 and the side member 2, said hanger thus affording support for the adjacent rigging intermediate the wheels. The upper end of the live truck lever 32 may have pivotal connection as at 50 with the clevis means 52 and the opposite end of said clevis means may be pivotally connected as at 54 to the diagonally arranged live cylinder lever 56. The outboard end of the live cylinder lever 56 may have pivotal connection as at 62 to the piston rod 64 associated with the power means or brake cylinder 66 supported as at 68 from the bracket 70 on the side member 2.

Intermediate its ends the live cylinder lever 56 may be further supported against lateral play by guiding means 72 engaging the bracket 74 on the side rail 2 and at a spaced point said live cylinder lever may have pivotal and adjustable connection as at 76 to the slack adjuster pull rod 78, said pull rod comprising the manual slack adjuster 80 and being slidably supported adjacent its opposite ends from the frame structure as at 81 and 83 (Figure 1). The opposite end of the pull rod 78 may have pivotal and adjustable connection as at 82 to the dead cylinder lever 84, the outboard end of which may have pivotal and adjustable connection as at 86 to the slack adjuster 88 mounted on one end of the power means 66 and further supported as at 90 from the bracket 92 on the side rail 2.

The inboard end of the dead cylinder lever 84 may have pivotal connection as at 94 with the clevis means 96, and the opposite end of said clevis means may have pivotal connection as at 98 with the live truck lever 100, the lower end of said lever having pivotal connection as at 102 to the brake head 104 supporting the brake shoe 106 and affording balancing means as at 108. Also connected at the pivot point 102 may be the brake hanger 110 hung at its upper end as at 112 from the bracket 114 integrally formed with the frame adjacent the juncture of the transom 8 and the side rail 2.

Intermediate its ends the live truck lever 100 may have pivotal connection as at 116 with the paired inboard and outboard straps 118, 118 and the opposite ends of said straps may have pivotal connection as at 120 with the dead truck lever 122, the upper end of which may be fulcrumed as at 124 from the bracket 126 integrally formed with the end rail 4 adjacent its juncture with the side member 2. Adjacent its lower end the dead truck lever 122 may have pivotal connection as at 128 to the clasp brake operating means generally designated 24 for this end of the truck.

Figure 5:
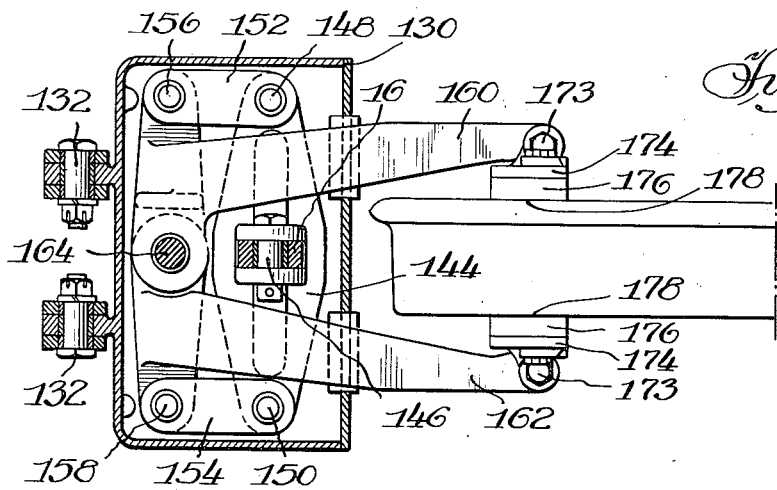
Figure 5 is a fragmentary sectional view taken in the diagonal planes through the operating means associated with the composition brake shoes, approximately as indicated by the line 5—5 of Figure 2.
Figure 6:
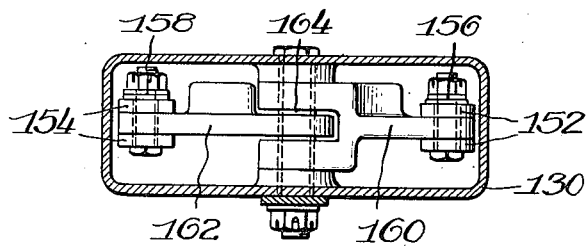
Figure 6 is a further sectional view taken through said operating means approximately in the plane indicated by the line 6—6 of Figure 2.

Each clasp brake operating means 24 may comprise a housing 130 (Figures 5 and 6, and Figure 2, left) supported at one extremity as at 132 from the twin brackets 134, 134 secured as at 136, 136 from the adjacent end rail. At its opposite end each housing 130 may have an upwardly projecting bracket 138, connected as at 140 to the paired arcuate arms 142, 142, the upper ends of which may be supported at the fulcrum point of the adjacent dead truck lever.

Each operating means 24 may comprise an equalizing lever 144 pivotally connected at its midpoint as at 146 to the adjacent dead truck lever, said equalizing lever 144 having a novel form described in detail hereinafter. The opposite ends of each equalizing lever 144 may have pivotal connection as at 148 and 150 respectively with links 152 and 154, the opposite ends of which links may have pivotal connection respectively as at 156 and 158 with bell crank levers 160 and 162, and said bell crank levers may be fulcrumed together at the pivot point 164, as well illustrated in Figure 6. Each bell crank lever may project through the housing and have pivotal connection as at 173 with the brake head 174 supporting the brake shoe 176 for engagement as at 178 with annular braking surfaces formed on the inboard and outboard faces of each wheel.

It will be understood by those skilled in the art that some lateral motion takes place between the wheel and axle assembly which is braked and the truck frame which affords support for the operating means 24. This operating means is designed to accommodate such relative lateral motion by means of sufficient clearance provided in the connection between the adjacent dead truck lever and the equalizing lever 144, as indicated at 146 in Figure 5. This clearance may be provided in the pin at 146 as well as in the tolerance of the fit between said dead lever and the parallel plates 188, 188, hereinafter described as comprising a portion of the equalizing lever 144.

Release means for each operating means 24 may be afforded in the form of a release spring 166 connected at one end as at 168 to the bracket 170 (Figure 2) secured to the housing 130 and at its opposite end as at 172 to the extremity of the adjacent dead truck lever which may project through the housing 130 for that purpose.

It may be noted that the metal brake shoes engaging the tread surfaces of the wheel have braking surfaces somewhat outboard the center plane of the wheel and inasmuch as the annular braking surfaces inboard and outboard of each wheel are equally spaced from the center plane of the wheel, it becomes necessary to compensate in some manner for this situation in order to prevent a diagonal or angular pull upon the wheel straps connecting the brake levers at opposite sides of each wheel. This compensation I have provided by diagonally offsetting the upper portion of each of the dead brake levers 16 and 122 at respective ends of the truck above the bosses where said levers are connected to the adjacent wheel straps so that the upper extremity of each of said levers is slightly offset in the outboard direction from that portion of the lever extending below said bosses. This construction may be clearly seen in the end view of Figure 3 where the upper end of the dead truck lever 122 may be seen to assume a slight diagonal position toward the outboard side of the wheel.

Similarly positioned brake heads at opposite sides of the truck intermediate the wheels may be connected by a strap 180 (Figure 4) connected at the pivot points of support of said heads.

My novel form of equalizing lever is shown in detail in Figures 7, 8 and 9 and comprises a main body portion 182 in outline similar to the usual brake lever with pivot openings 184, 184 at opposite ends thereof. The said body portion 182 is formed with an elongated central slot 186 widened at the middle of the lever to receive the spaced parallel plates 188, 188 affording pivot pin seats and guide means for an associated lever, and said plates may be welded as at 190, 190 at the midportion of the slot or integrally formed therewith. The plates 188, 188 are formed with aligned pin openings 192, 192 affording a means of pivotal connection to the associated dead brake lever which may act as actuating means therefor. By use of this novel form of equalizing lever I am able to afford great economy in the space requirements necessary for actuation of each operating means 24 because each of these pivotal connections at 146 takes the place of what otherwise would be an ordinary clevis connection.

The method of operation of my novel brake mechanism will be clearly apparent to those skilled in the art. It will be understood that the braking means at each side of the truck is actuated by the associated power means and that the metal shoes intermediate the wheels are actuated simultaneously with the clasp brake operating means utilizing composition shoes for engagement with the inboard and outboard faces of each wheel at the extremities of the truck.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a four wheel railway car truck, a truck frame having a side member, power means thereon, interconnected live and dead cylinder levers connected at opposite ends to said power means, and braking means for each wheel at one side of the truck connected respectively to the opposite ends of said cylinder levers, each of said braking means comprising interconnected live and dead brake levers supported at opposite sides of the wheel, one of said brake levers supporting wheel tread braking means, and the other of said brake levers being associated with clasp brake means for engaging inboard and outboard braking surfaces on said wheel, said clasp brake means including a housing supported from said frame, an equalizer mounted in said housing, a plurality of crank levers fulcrumed together in said housing and operatively connected at opposite ends of said equalizer, and an operative connection between said equalizer and the adjacent brake lever, said operative connection comprising a pivotal connection between said last-mentioned brake lever and said equalizer so constructed and arranged that said last-mentioned brake lever may extend through said equalizer for connection to associated release means.

2. In a brake arrangement for a wheeled railway car truck, a truck frame having a side member, power means thereon, interconnected live and dead cylinder levers connected at opposite ends to said power means, and braking means for each wheel at one side of the truck connected respectively to the opposite ends of said cylinder levers, each of said braking means comprising interconnected live and dead brake levers supported at opposite sides of the wheel, one of said brake levers supporting wheel tread braking means, and the other of said brake levers supporting clasp brake means for engaging inboard and outboard braking surfaces on said wheel, said clasp brake means including a housing supported from said frame, an equalizer mounted in said housing, a plurality of crank levers fulcrumed from a common point in said housing and operatively connected at opposite ends of said equalizer, and an operative connection between said equalizer and the adjacent brake lever, said operative connection comprising a pivotal connection.

3. In a brake arrangement for a four wheel railway car truck, a truck frame having a side member, power means thereon, interconnected live and dead cylinder levers connected at opposite ends to said power means, and braking means for each wheel at one side of the truck connected respectively to the opposite ends of said cylinder levers, each of said braking means comprising a live brake lever at one side of the wheel, a dead brake lever at the opposite side of the wheel, straps connecting said brake levers, wheel tread braking means associated with one of said brake levers, and clasp brake means for the wheel associated with the other of said brake levers, said clasp brake means comprising an equalizer connected at its midpoint to the adjacent brake lever, bell crank levers fulcrumed from a common point and connected to respective ends of said equalizer, and composition brake shoes mounted on said bell crank levers for engagement with inboard and outboard faces of the adjacent wheel.

4. In a brake arrangement for a railway car truck, a truck frame having a side member, power means thereon, interconnected live and dead cylinder levers connected at opposite ends to said power means, and braking means for each wheel at one side of the truck connected respectively to the opposite ends of said cylinder levers, each of said braking means comprising interconnected live and dead brake levers supported at opposite sides of the wheel, one of said brake levers supporting wheel tread braking means, and the other of said brake levers being associated with clasp brake means for engaging inboard and outboard braking surfaces on said wheel, said clasp brake means including a housing supported from said frame, an equalizer mounted in said housing, a plurality of crank levers fulcrumed from a common point in said housing and operatively connected at opposite ends of said equalizer, and an operative connection between said equalizer and the adjacent brake lever.

5. In a brake arrangement for a railway car truck, a truck frame having a side member, power means thereon, interconnected live and dead cylinder levers connected at opposite ends to said power means, and braking means for each wheel at one side of the truck connected respectively to the opposite ends of said cylinder levers, each of said braking means comprising interconnected live and dead brake levers supported at opposite sides of the wheel, one of said brake levers supporting wheel tread braking means, and the other of said brake levers operating clasp brake means for engaging inboard and outboard braking surfaces on said wheel, said clasp brake means including a housing supported from said frame, an equalizer mounted in said housing, and a plurality of crank levers fulcrumed from a common point in said housing and operatively connected at opposite ends of said equalizer.

6. In a brake arrangement, a truck frame, a supporting wheel, clasp brake means comprising a member supported from said frame, a plurality of brake shoe carrying bell crank levers fulcrumed from a common point in said member, an equalizer supported in said member intermediate said point and said wheel and operatively connected to said bell crank levers respectively, and means for actuating said equalizer to cause said brake shoes to engage inboard and outboard faces of said wheel.

7. In a brake arrangement, clasp brake means comprising a truck frame member, a housing supported therefrom, an equalizer in said housing, a plurality of bell crank levers fulcrumed from a common point in said housing and operatively connected to said equalizer, and means for actuating said equalizer, said actuating means comprising a vertical lever pivotally connected at the mid-point of said equalizer and extending therethrough for connection to associated release means.

8. In a brake arrangement, clasp brake means comprising a truck frame member, a housing supported therefrom, an equalizer in said housing, a plurality of bell crank levers fulcrumed from a common point in said housing and operatively connected to said equalizer, and means for actuating said equalizer, said actuating means comprising a vertical lever pivotally connected at the mid-point of said equalizer.

9. In a brake arrangement, a truck frame, a supporting wheel, clasp brake means comprising a housing hung from said frame, a plurality of bell crank levers fulcrumed from a common point in said housing, an equalizer mounted in said housing intermediate said point and said wheel, and a vertical brake lever connected intermediate its ends to the midpoint of said equalizer for actuation thereof.

10. In a brake arrangement, a truck frame, a supporting wheel, clasp brake means comprising a housing hung from said frame, a plurality of bell crank levers fulcrumed from a common point in said housing, an equalizer mounted in said housing between said point and said wheel, and operating means for said equalizer in the form of a dead brake lever hung from said frame and having an intermediate point operatively connected to the midpoint of said equalizer.

11. In a brake arrangement, a truck frame, a supporting wheel, clasp brake means including a fulcrum member hung from said frame, horizontally arranged levers fulcrumed from a common point in said member, an equalizer supported from said member intermediate said point and said wheel and operatively connected at its ends to said horizontal levers respectively, and a vertical lever fulcrumed at one end from said frame and connected adjacent the other end to said equalizer for actuation thereof.

12. In a brake arrangement, a truck frame, a supporting wheel, clasp brake means comprising a housing hung from said frame, a plurality of bell crank levers fulcrumed from a common point in said housing, an equalizer mounted in said housing between said point and said wheel, operating means for said equalizer in the form of a dead brake lever hung from said frame and having an intermediate point operatively connected to the midpoint of said equalizer, and release means connected between said housing and the opposite end of said dead brake lever.

13. In a brake arrangement, a truck frame, a supporting wheel, clasp brake means comprising a housing hung from said frame, a plurality of bell crank levers fulcrumed from a common point in said housing, an equalizer mounted in said housing between said point and said wheel, operating means for said equalizer in the form of a dead brake lever hung from said frame and having an intermediate point operatively connected to the midpoint of said equalizer, and over-axle straps connected to said dead brake lever intermediate the fulcrum point thereof and said equalizer.

14. In a brake arrangement, a truck frame, a supporting wheel, clasp brake means comprising a housing hung from said frame, a plurality of bell crank levers fulcrumed from a common point in said housing, an equalizer mounted in said housing between said point and said wheel, operating means for said equalizer in the form of a dead brake lever hung from said frame and having an intermediate point operatively connected to the midpoint of said equalizer, and over-axle straps connected to said dead brake lever intermediate the fulcrum point thereof and said equalizer, said dead brake lever being diagonally arranged above said strap connection to accommodate a fulcrum point laterally offset with respect to the plane of said lever.

15. In a brake arrangement, a truck frame, a supporting wheel, clasp brake means including a fulcrum member hung from said frame, horizontally arranged levers fulcrumed from a common point in said member, an equalizer supported from said member intermediate said point and said wheel and operatively connected at its ends to said horizontal levers respectively, and a vertical lever fulcrumed at one end from said frame and connected adjacent the other end to said equalizer for actuation thereof, said vertical lever also being connected at an intermediate point to over-axle straps.

16. In a brake arrangement, a truck frame, a supporting wheel, clasp brake means including a fulcrum member hung from said frame, horizontally arranged levers fulcrumed from a common point in said member, an equalizer supported from said member intermediate said point and said wheel and operatively connected at its ends to said horizontal levers respectively, and a vertical lever fulcrumed at one end from said frame and connected adjacent the other end to said equalizer for actuation thereof, said vertical lever being operatively connected at its other end to release means.

17. In a clasp brake arrangement, horizontally arranged brake levers each comprising a short arm and a long arm extending from an intermediate point thereof approximately at right angles to said short arm, adjacent ends of said short arms being connected at a common fulcrum point, an equalizer associated with said levers and operatively connected at its respective ends to the remote ends of said short arms, and means projecting between said long arms and connected to said equalizer for actuation thereof.

18. In a clasp brake arrangement, a fulcrum member, an equalizer supported therein, means for actuating said equalizer, and a plurality of bell crank levers fulcrumed at a common point in said member at one side of said equalizer and connected at intermediate points respectively to opposite ends of said equalizer, said levers extending to the opposite side of said equalizer for support of associated brake shoes.

WESLEY A. HELSTEN.